United States Patent
Shu et al.

(10) Patent No.: US 9,079,151 B2
(45) Date of Patent: Jul. 14, 2015

(54) ELECTRONIC INK MICROCAPSULE AND A METHOD FOR PRODUCING THE SAME

(75) Inventors: Shi Shu, Beijing (CN); Ming Zhao, Beijing (CN); Jianshe Xue, Beijing (CN); Xiaoxiong Tian, Beijing (CN); Wenwen Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 428 days.

(21) Appl. No.: 13/464,013

(22) Filed: May 4, 2012

(65) Prior Publication Data

US 2012/0283376 A1    Nov. 8, 2012

(30) Foreign Application Priority Data

May 4, 2011  (CN) .......................... 2011 1 0113974

(51) Int. Cl.
  *B01J 13/10*  (2006.01)
  *C09D 11/10*  (2014.01)
  *B01J 13/20*  (2006.01)

(52) U.S. Cl.
  CPC ............. *B01J 13/10* (2013.01); *B01J 13/206* (2013.01); *C09D 11/10* (2013.01)

(58) Field of Classification Search
  CPC .......... B01J 13/10; B01J 13/026; C09D 11/10
  USPC ................. 524/544; 526/245, 271, 272, 347
  See application file for complete search history.

(56) References Cited

U.S. PATENT DOCUMENTS

| 3,030,342 | A | * | 4/1962 | Tiefenthal et al. ............. 525/369 |
| 3,467,634 | A | * | 9/1969 | Moriconi et al. ............. 526/279 |
| 3,887,513 | A | * | 6/1975 | Fritze et al. .................. 524/272 |
| 5,032,641 | A | * | 7/1991 | Nanishi et al. ................ 524/544 |
| 5,035,844 | A | * | 7/1991 | North .......................... 264/4.33 |

FOREIGN PATENT DOCUMENTS

| CN | 1544141 A | | 11/2004 |
| CN | 1919940 A | | 2/2007 |
| CN | 101463108 A | * | 6/2009 |
| CN | 101609239 A | | 12/2009 |
| CN | 101711966 A | | 5/2010 |
| CN | 101974118 A | * | 2/2011 |
| GB | 1266400 A | * | 3/1972 |
| JP | 2000-109896 A | | 4/2000 |
| WO | WO 02103103 A2 | * | 12/2002 |

OTHER PUBLICATIONS

Derwent Abstract of CN 101463108 A, 2009.*
Machine translation of CN 101974118 A, Global Patent Search Network, Oct. 2014.*
English Translation of First Office Action dated Oct. 12, 2013; Appln. No. 201110113974.7.

* cited by examiner

*Primary Examiner* — Nicole M Buie-Hatcher
(74) *Attorney, Agent, or Firm* — Ladas & Parry LLP

(57) ABSTRACT

Embodiments of the disclosed technology provide an electronic ink microcapsule and a method for producing the same, wherein the electronic ink microcapsule comprises gelatin, polyanion, and an electrophoretic suspension, and the polyanion comprises a hydrolyzate of styrene-maleic anhydride-hexafluorobutyl (meth)acrylate-vinyl triethoxysilane tetracopolymer.

20 Claims, 1 Drawing Sheet

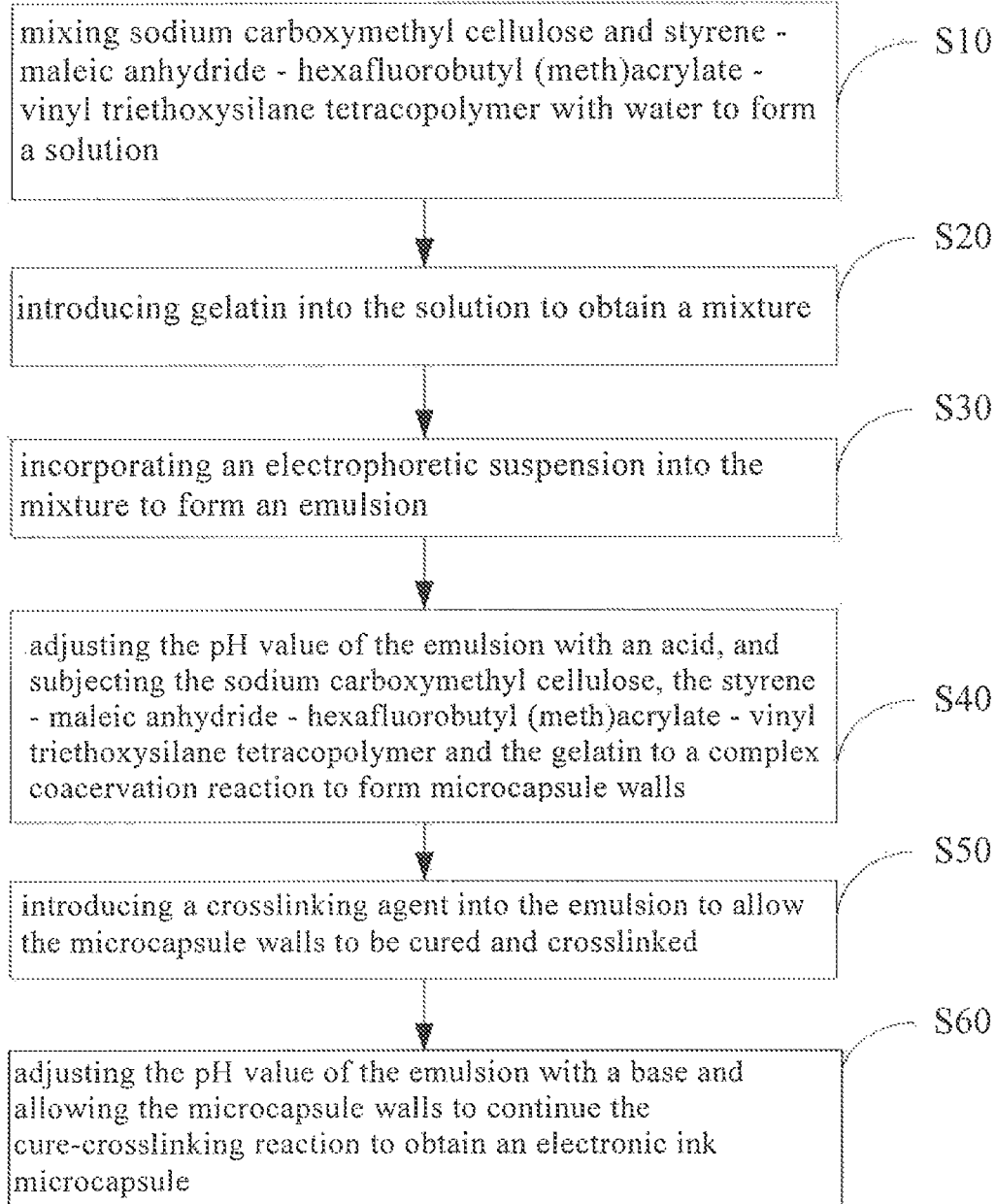

ELECTRONIC INK MICROCAPSULE AND A METHOD FOR PRODUCING THE SAME

CROSS REFERENCE TO RELATED APPLICATIONS

This application claims the benefit to Chinese Application No. 201110113974.7 filed May 4, 2011, the entire disclosure of which is incorporated herein by reference.

BACKGROUND

The disclosed technology relates to an electronic ink microcapsule and a method for producing the same.

With the advances in information science and technology, the flat panel displays are developed to possess the features of lightness, low power, and low drive voltage are becoming desirable. The development of electrophoretic display technology, in particular, microcapsule electrophoretic display technology has become rapid.

Microcapsule electrophoretic display technology is a reflective display technology based on electrophoresis of charged particles suspended in a dispersion medium, and this technology has the following characteristics: i) microcapsules mixed in the adhesive liquid can be applied on the backplate by inkjet printing, coating, etc. so that it is suitable for flexible displays; and ii) microcapsule electrophoretic display technology employs electrophoretic particles and insulation suspension liquid encapsulated in microcapsules, which can inhibit the aggregation and deposition of electrophoretic particles, thereby enhancing the stability and life of the electrophoretic display. Due to the above characteristics of the microcapsule electrophoretic display technology, it has been widely studied.

Nakamura investigated microcapsules in a gelatin-arabic gum system, in which the capsule wall of the microcapsules is attached on the droplet core after precipitation resulting from agglomeration of gelatin as a polycation and arabic gum as a polyanion in the aqueous phase. However, arabic gum tends to degrade during the usage of such microcapsules, and long-term use ruins the capsule barrier. Moreover, arabic gum is expensive so that such a system is not suitable for a large-scale commercial use.

Therefore, researchers have developed microcapsules containing silicone, which employs gelatin as a polycation, sodium carboxymethyl cellulose as a polyanion, and anionic perfluorinated surfactant as an emulsifier. During preparing a display from the microcapsules produced according to this process, the perfluorinated surfactant, as a small molecule material, tends to reduce the surface tension of the used adhesive, so that the adhesive coated on the backplate shrinks and can not wet the backplate, resulting in an increase in the product defect rate.

In addition, researchers also developed fluorine-containing microcapsules, which are based on gelatin as a polycation, and a copolymer of vinyl silicone oil, styrene and maleic anhydride as a polyanion. Such microcapsules have the following disadvantages during use. Firstly, carboxyl (—COOH) remaining in the gelatin may easily lead to deterioration of the electrophoresis solution or the electrophoretic particles, and the stability and barrier of the capsule wall is poor; secondly, the dye in the electrophoresis solution is instable in chemical properties and tends to fade; and thirdly, the terminal double bond in silicone oil is an active group and tends to cause deterioration of dyes.

SUMMARY

Embodiments of the disclosed technology provide an electronic ink microcapsule exhibiting excellent barrier property and stability and its production method. The dye in the electrophoretic solution can be non-degenerative, and the defects such as shrinkage do not occur in the production process of a display, thereby improving the qualification ratio of the display products.

An embodiment of the disclosed technology provides an electronic ink microcapsule comprising gelatin, polyanion, and an electrophoretic suspension, wherein the polyanion comprises a hydrolyzate of styrene-maleic anhydride-hexafluorobutyl (meth)acrylate-vinyl triethoxysilane tetracopolymer.

In one example, the styrene-maleic anhydride-hexafluorobutyl (meth)acrylate-vinyl triethoxysilane tetracopolymer is of the general formula:

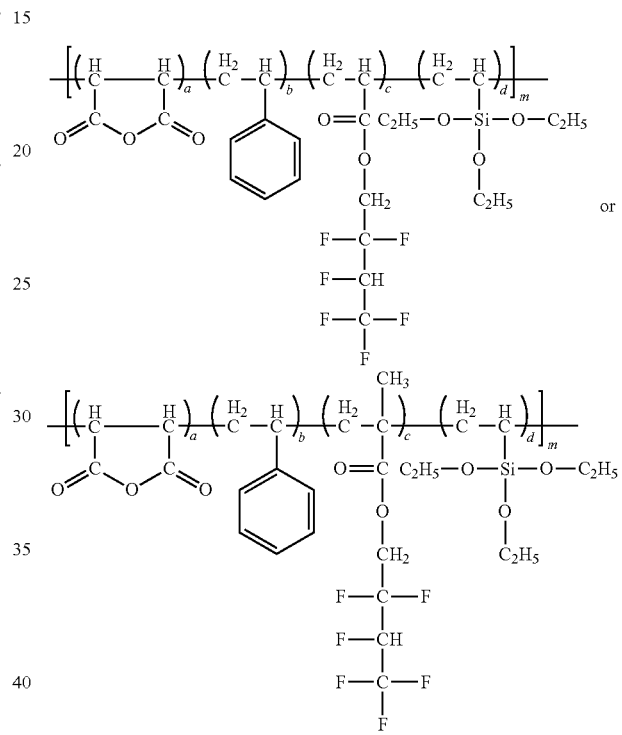

in which $a=1\sim10$, $b=1\sim50$, $c=1\sim50$, $d=1\sim50$, and $m=10\sim100$.

In one example, the styrene-maleic anhydride-hexafluorobutyl (meth)acrylate-vinyl triethoxysilane tetracopolymer has a number-average molecular weight of about 3,000 to about 550,000.

In one example, the polyanion further comprises sodium carboxymethyl cellulose.

In one example, the mass ratio of gelatin to sodium carboxymethyl cellulose is between about 0.5:1 and about 50:1.

In one example, the mass ratio of sodium carboxymethyl cellulose to styrene-maleic anhydride-hexafluorobutyl (meth)acrylate-vinyl triethoxysilane tetracopolymer is between about 1:1 to about 120:1.

In one example, the electrophoretic suspension is tetrachloroethylene which comprises electrophoretic particles, dye and auxiliary, and the mass ratio of the electrophoretic suspension to the gelatin, the sodium carboxymethyl cellulose and the styrene-maleic anhydride-hexafluorobutyl (meth)acrylate-vinyl triethoxysilane tetracopolymer is between about 0.5:1 and about 100:1.

In one example, it also comprises one or more crosslinking agent(s) selected from the group consisting of formaldehyde, acetaldehyde, succinic aldehyde, and glutaraldehyde.

Another embodiment of this disclosed technology provides a method for producing an electronic ink microcapsule, comprising the step of adding a hydrolyzate of styrene-maleic anhydride-hexafluorobutyl (meth)acrylate-vinyl triethoxysilane tetracopolymer as a polyanion.

In one example, the method comprises the following steps:

step s10 of mixing sodium carboxymethyl cellulose and the styrene-maleic anhydride-hexafluorobutyl (meth)acrylate-vinyl triethoxysilane tetracopolymer with water to form a solution;

step s20 of introducing gelatin into the solution to obtain a mixture;

step s30 of incorporating an electrophoretic suspension into the mixture to form an emulsion;

step s40 of adjusting the pH value of the emulsion with an acid, and subjecting the sodium carboxymethyl cellulose, the styrene-maleic anhydride-hexafluorobutyl (meth)acrylate-vinyl triethoxysilane tetracopolymer and the gelatin to a complex coacervation reaction to form microcapsule walls;

step s50 of introducing a crosslinking agent into the emulsion to allow the microcapsule walls to be cured and crosslinked; and step s60 of adjusting the pH value of the emulsion with a base and allowing the microcapsule walls to continue the cure-crosslinking reaction to obtain an electronic ink microcapsule.

In one example, the styrene-maleic anhydride-hexafluorobutyl (meth)acrylate-vinyl triethoxysilane tetracopolymer is of the general formula:

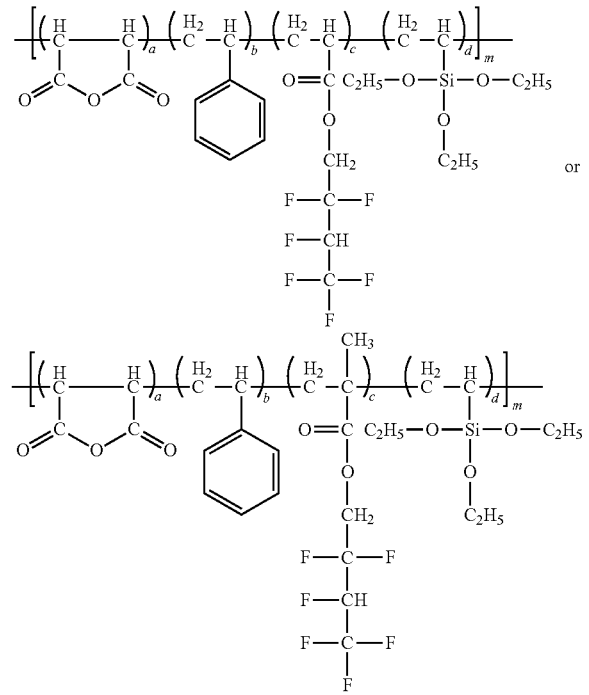

in which $a=1\sim10$, $b=1\sim50$, $c=1\sim50$, $d=1\sim50$, and $m=10\sim100$.

In one example, the styrene-maleic anhydride-hexafluorobutyl (meth)acrylate-vinyl triethoxysilane tetracopolymer has a number-average molecular weight of about 3,000 to about 550,000.

In one example, in the solution of the step s10, the mass ratio of the sodium carboxymethyl cellulose to the styrene-maleic anhydride-hexafluorobutyl (meth)acrylate-vinyl triethoxysilane tetracopolymer is between about 1:1 and about 120:1.

In one example, in the mixture of step s20, the mass ratio of the gelatin to the sodium carboxymethyl cellulose is between about 0.5:1 and about 50:1.

In one example, in the emulsion of step s30, the electrophoretic suspension is tetrachloroethylene which comprises electrophoretic particles, dye and auxiliary, and the mass ratio of the electrophoretic suspension to the gelatin, the sodium carboxymethyl cellulose and the styrene-maleic anhydride-hexafluorobutyl (meth)acrylate-vinyl triethoxysilane tetracopolymer is between about 0.5:1 and about 100:1.

In one example, the acid is hydrochloric acid, sulfuric acid, acetic acid, citric acid or tartaric acid, and its concentration is between about 0.05 wt % and about 20 wt %.

In one example, in the step s50, the temperature of the emulsion is cooled down to about 0~15° C. prior to the introducing of the crosslinking agent, and the cure-crosslinking reaction time is about 1~20 hours.

In one example, the crosslinking agent is one or more selected from the group consisting of formaldehyde, acetaldehyde, succinic aldehyde, and glutaraldehyde.

In one example, in the step s60, the adjusted pH value of the emulsion is between about 1 to about 12 and the cure-crosslinking reaction continues at about 30~60° C. for about 1 hour to about 5 hours.

Still another embodiment of the disclosed technology provides an electronic ink display device, comprising electronic ink microcapsules, which comprise: gelatin, polyanion, and an electrophoretic suspension, wherein the polyanion comprises a hydrolyzate of styrene-maleic anhydride-hexafluorobutyl (meth)acrylate-vinyl triethoxysilane tetracopolymer.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF DRAWING

The disclosed technology will become more fully understood from the detailed description given hereinafter and the accompanying drawings which are given by way of illustration only, and thus are not limitative of the disclosed technology and wherein:

FIG. 1 illustrates a flowchart of a method for producing an electronic ink microcapsule according to an embodiment of the disclosed technology.

DETAILED DESCRIPTION

In order to facilitate the artisans in the technical field to understand the embodiments of the disclosed technology, an electronic ink microcapsule and the production method thereof according to an embodiment of the disclosed technology are described in detail with reference to the accompanying drawing.

This embodiment provides an electronic ink microcapsule comprising gelatin, polyanion, and electrophoretic suspension. The polyanion comprises a hydrolyzate of styrene-maleic anhydride-hexafluorobutyl (meth)acrylate-vinyl triethoxysilane tetracopolymer, or a mixture of the hydrolyzate and sodium carboxymethyl cellulose, and the electrophoretic suspension is tetrachloroethylene containing electrophoretic particles, dye and auxiliary. Titanium dioxide or silica can be used as the electrophoretic particles. Azo dyes or anthraquinone dyes can be used as the dye. The auxiliary is a charge-controlling agent, such as polyisosuccinic anhydride.

In this embodiment, the mass ratio of the gelatin to the sodium carboxymethyl cellulose is about 0.5:1 to about 50:1, preferably about 0.5:1 to about 2:1. The mass ratio of the sodium carboxymethyl cellulose to the styrene-maleic anhydride-hexafluorobutyl (meth)acrylate-vinyl triethoxysilane tetracopolymer is between about 1:1 and about 120:1, preferably about 1:1 to about 3:1. The mass ratio of the electrophoretic suspension to the sum of the gelatin, the sodium carboxymethyl cellulose and the styrene-maleic anhydride-hexafluorobutyl (meth)acrylate-vinyl triethoxysilane tetracopolymer is between about 0.5:1 and about 100:1, preferably about 1:1 to about 2:1.

Electronic ink microcapsule may also comprise a cross-linking agent to allow microcapsule wall to undergo a cross-linking reaction. The cross-linking agent can be one or more selected from the group consisting of formaldehyde, acetaldehyde, succinic aldehyde, and glutaraldehyde.

In this embodiment, the styrene-maleic anhydride-hexafluorobutyl (meth)acrylate-vinyl triethoxysilane tetracopolymer can not only undergo a complex coacervation reaction with gelatin as a polyanion, but also emulsify the electrophoretic suspension as a polymeric emulsifier. This polymer has the structure of the general formula:

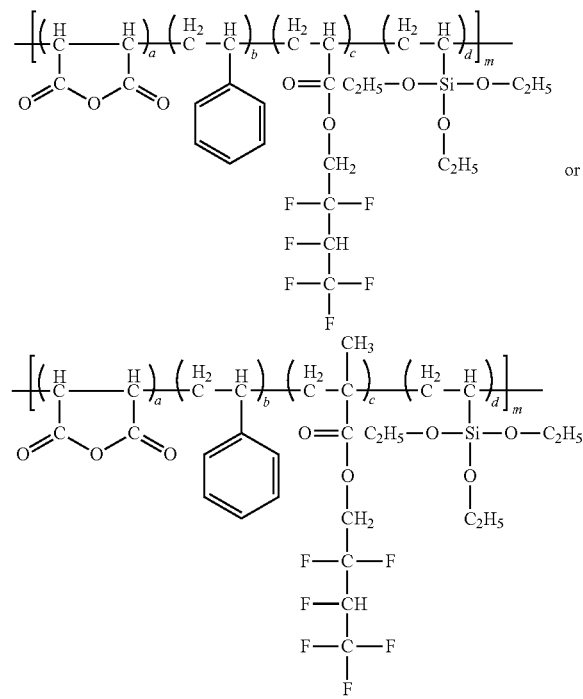

in which a=1~10, b=1~50, c=1~50, d=1~50, and m=10~100.

The styrene-maleic anhydride-hexafluorobutyl (meth)acrylate-vinyl triethoxysilane tetracopolymer may have a number-average molecular weight of about 3,000 to about 550,000.

The electronic ink microcapsule provided by an embodiment of the disclosed technology uses a hydrolyzate of styrene-maleic anhydride-hexafluorobutyl (meth)acrylate-vinyl triethoxysilane tetracopolymer as the polyanion. Due to the fluoride-containing (meth)acrylate monomer, aggregation of fluorine atoms on the backplate surface can be avoided, and too low surface tension of the adhesive can also be avoided, and thus the defects such as the shrinkage of the adhesive coated on the backplate and not wetting the backplate can be avoided, thereby improving the yield of the products. In addition, fluorosilicon allows the microcapsule wall to have a low surface energy and good stability, and such electronic ink microcapsule has a small amount of fluorine-containing monomer and therefore high utilization. Furthermore, Si—OH from the hydrolysis of the silane can react with carboxyl groups in the microcapsule wall, which thus further improves the thermal stability and chemical stability of the microcapsule wall, and therefore significantly improves the barrier of microcapsules to the electrophoretic suspension, and also avoids deterioration of the electrophoretic particles and the dye.

Another embodiment of the disclosed technology provides an electronic ink microcapsule production method using sodium carboxymethyl cellulose and a hydrolyzate of styrene-maleic anhydride-hexafluorobutyl (meth)acrylate-vinyl triethoxysilane tetracopolymer as polyanion, and the electrophoretic suspension is tetrachloroethylene which comprises electrophoretic particles, dye and auxiliary.

FIG. 1 is a flowchart of a method for producing an electronic ink microcapsule according to the embodiment of the disclosed technology. As shown in FIG. 1, a method for producing electronic ink microcapsules comprises the following steps:

step s10, mixing sodium carboxymethyl cellulose and styrene-maleic anhydride-hexafluorobutyl (meth)acrylate-vinyl triethoxysilane tetracopolymer with water to form a solution.

The styrene-maleic anhydride-hexafluorobutyl (meth)acrylate-vinyl triethoxysilane tetracopolymer can not only undergo a complex coacervation reaction with gelatin as a polyanion, but also emulsify the electrophoretic suspension as a polymeric emulsifier, and its structural formula is:

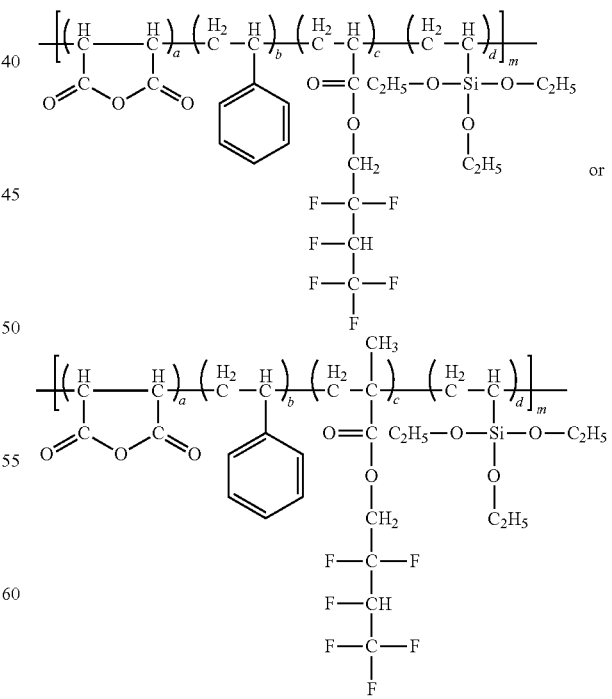

in which a=1~10, b=1~50, c=1~50, d=1~50, and m=10~100.

Moreover, the styrene-maleic anhydride-hexafluorobutyl (meth)acrylate-vinyl triethoxysilane tetracopolymer may have a number-average molecular weight of about 3,000 to about 550,000.

In this embodiment, the mass ratio of sodium carboxymethyl cellulose to styrene-maleic anhydride-hexafluorobutyl (meth)acrylate-vinyl triethoxysilane tetracopolymer may be about 1:1 to about 120:1.

In order to dissolve sodium carboxymethyl cellulose and styrene-maleic anhydride-hexafluorobutyl (meth)acrylate-vinyl triethoxysilane tetracopolymer in a quick way, sodium carboxymethyl cellulose and styrene-maleic anhydride-hexafluorobutyl (meth)acrylate-vinyl triethoxysilane tetracopolymer may be dissolved preferably at a temperature below 60 centigrade (° C.) to form a solution.

Step s20, adding gelatin to the solution to form a mixture.

Firstly, gelatin is dissolved in water to form an aqueous solution, and then this aqueous solution is added into the solution formed in step s10. In the mixture, the mass ratio of gelatin and sodium carboxymethyl cellulose may be 0.5:1 to 50:1, preferably 0.5:1 to 2:1.

Step s30, adding electrophoretic suspension to the mixture to form an emulsion.

A uniform electrophoretic suspension can be obtained by adding electrophoretic particles, dye and auxiliary to tetrachloroethylene and then performing ultrasonic dispersion, wherein the concentration of the electrophoretic particle is 5~25 wt %, and the dye concentration is 10~30 wt %. The electrophoretic suspension is then added to the mixture obtained in step s20, and agitated at a stirring rate of 730 rpm (r/min) for 50 minutes to form an O/W type emulsion. Of course, the stifling rate and mixing time can be adjusted according to the situation.

In this embodiment, the mass ratio of the electrophoretic suspension to the sum of gelatin, sodium carboxymethyl cellulose and styrene-maleic anhydride-hexafluorobutyl (meth)acrylate-vinyl triethoxysilane tetracopolymer may be 0.5:1 to 100:1, preferably from 1:1 to 2:1.

Step s40, the pH value of the emulsion is regulated by adding an acid so that gelatin, sodium carboxymethyl cellulose, and styrene-maleic anhydride-hexafluorobutyl (meth)acrylate-vinyl triethoxysilane tetracopolymer undergo a complex coacervation reaction to form the microcapsule wall of the microcapsule.

After adding acid, the pH value of the emulsion can be adjusted to about 2~6. The acid added may be hydrochloric acid, sulfuric acid, acetic acid, citric acid or tartaric acid, and its concentration may be 0.05 to 20 wt %.

Step s50, adding a cross-linking agent the emulsion to cure and crosslink the microcapsule wall.

In order to reduce evaporation loss of the cross-linking agent, the emulsion is slowly cooled to 0~15° C., and then the crosslinking agent is added dropwise at a concentration of 15 wt %. The mass ratio of the crosslinking agent to gelatin may be 0.5:10 to 1.5:10. Gelatin, styrene-maleic anhydride-hexafluorobutyl (meth)acrylate-vinyl triethoxysilane tetracopolymer and sodium carboxymethyl cellulose are allowed to react for 1~20 hours to form the crosslinked capsule wall. Cross-linking agent may be one or more selected from formaldehyde, acetaldehyde, succinic aldehyde, and glutaraldehyde.

Step s60, adding a base to the emulsion to adjust the pH value to continue the crosslinking reaction, resulting in electronic ink microcapsules.

In order to facilitate the crosslinking reaction, a base such as a sodium hydroxide solution at a concentration of 1 to 7 wt % is added to the emulsion to adjust the pH value of the emulsion to between 1 and 12, then the gelatin, styrene-maleic anhydride-hexafluorobutyl (meth)acrylate-vinyl triethoxysilane tetracopolymer and sodium carboxymethyl cellulose continue the reaction at 30~60° C. for 1 hour to 5 hours, resulting in electronic ink microcapsules.

For example, in the production of electronic ink microcapsules, the following preparations need to be made at first, i.e., formulating sodium carboxymethyl cellulose into an aqueous solution with a concentration of 0.5 wt %, formulating the styrene-maleic anhydride-hexafluorobutyl (meth)acrylate-vinyl triethoxysilane tetracopolymer having a number average molecular weight of about 8,000 into an aqueous solution with a concentration of 5 wt % (these two aqueous solutions are then stored at 80° C.); formulating gelatin into an aqueous solution with a concentration of 10 wt % (this aqueous solution is then stored at 60° C.); and adding the electrophoretic particles, dye and auxiliary to tetrachloroethylene to form a uniform electrophoretic suspension after ultrasonic dispersion.

Example 1 a. Sodium carboxymethyl cellulose and styrene-maleic anhydride-hexafluorobutyl (meth)acrylate-vinyl triethoxysilane tetracopolymer hydrolyzate at a mass ratio of 1:1 are added into water, and completely dissolved at 40° C. to form a solution;

b. to the solution obtained from the step a, the gelatin aqueous solution is added, wherein the mass ratio of gelatin to sodium carboxymethyl cellulose is 0.5:1;

c. to the mixture obtained from the step b, the electrophoretic suspension is added and stirred to form an O/W type emulsion, wherein the mass ratio of the electrophoretic suspension to the sum of gelatin, sodium carboxymethyl cellulose and the styrene-maleic anhydride-hexafluorobutyl (meth)acrylate-vinyl triethoxysilane tetracopolymer hydrolyzate is 100:1;

d. hydrochloric acid with a concentration of 0.05 wt % is added to adjust the pH value of the emulsion to 2, and gelatin, sodium carboxymethyl cellulose and styrene-maleic anhydride-hexafluorobutyl (meth)acrylate-vinyl triethoxysilane tetracopolymer undergo a complex coacervation reaction to form a microcapsule wall;

e. the temperature of the emulsion is cooled to 0° C., and then the crosslinking agent at a concentration of 15 wt % is added dropwise to the emulsion to allow the microcapsule walls to undergo the crosslinking reaction for 1 hour, wherein the mass ratio of the crosslinking agent to gelatin is 0.5:10;

f. 1 wt % sodium hydroxide solution is added to adjust the pH of the emulsion to 1, and then the temperature of the emulsion rise to 30° C. and the crosslinking reaction continues for 5 hours to obtain electronic ink microcapsules, that is, to obtain electronic ink microcapsules containing fluorine and silicon.

Example 2 a. Sodium carboxymethyl cellulose and styrene-maleic anhydride-hexafluorobutyl (meth)acrylate-vinyl triethoxysilane tetracopolymer hydrolyzate at a mass ratio of 20:1 are added to water, and completely dissolved at 40° C. to form a solution;

b. to the solution obtained from the step a, the gelatin aqueous solution is added, wherein the mass ratio of gelatin to sodium carboxymethyl cellulose is 5:1;

c. to the mixture obtained from the step b, the electrophoretic suspension is added and stirred to form an O/W type emulsion, wherein the mass ratio of the electrophoretic suspension to the sum of gelatin, sodium carboxymethyl cellulose and the styrene-maleic anhydride-hexafluorobutyl (meth)acrylate-vinyl triethoxysilane tetracopolymer hydrolyzate is 60:1;

d. hydrochloric acid with a concentration of 0.5 wt % is added to adjust the pH value of the emulsion to 3, and gelatin, sodium carboxymethyl cellulose and styrene-maleic anhydride-hexafluorobutyl (meth)acrylate-vinyl triethoxysilane tetracopolymer undergo a complex coacervation reaction to form a microcapsule wall;

e. the temperature of the emulsion is cooled to 2° C., and then the crosslinking agent at a concentration of 15 wt % is added dropwise to the emulsion to allow the microcapsule walls to undergo the crosslinking reaction for 5 hours, wherein the mass ratio of the crosslinking agent to gelatin is 0.8:10;

f. 2 wt % sodium hydroxide solution is added to adjust the pH of the emulsion to 3, and then the temperature of the emulsion rise to 35° C. and the crosslinking reaction continues for 4 hours to obtain electronic ink microcapsules, that is, to obtain electronic ink microcapsules containing fluorine and silicon.

Example 3 a. Sodium carboxymethyl cellulose and styrene-maleic anhydride-hexafluorobutyl (meth)acrylate-vinyl triethoxysilane tetracopolymer hydrolyzate at a mass ratio of 50:1 are added to water, and completely dissolved at 40° C. to form a solution;

b. to the solution obtained from the step a, the gelatin aqueous solution is added, wherein the mass ratio of gelatin to sodium carboxymethyl cellulose is 20:1;

c. to the mixture obtained from the step b, the electrophoretic suspension is added and stirred to form an O/W type emulsion, wherein the mass ratio of the electrophoretic suspension to the sum of gelatin, sodium carboxymethyl cellulose and the styrene-maleic anhydride-hexafluorobutyl (meth)acrylate-vinyl triethoxysilane tetracopolymer hydrolyzate is 20:1;

d. hydrochloric acid with a concentration of 2 wt % is added to adjust the pH value of the emulsion to 4, and gelatin, sodium carboxymethyl cellulose and styrene-maleic anhydride-hexafluorobutyl (meth)acrylate-vinyl triethoxysilane tetracopolymer undergo a complex coacervation reaction to form a microcapsule wall;

e. the temperature of the emulsion is cooled to 10° C., and then the crosslinking agent at a concentration of 15 wt % is added dropwise to the emulsion to allow the microcapsule walls to undergo the crosslinking reaction for 10 hours, wherein the mass ratio of the crosslinking agent to gelatin is 0.8:10;

f. 2 wt % sodium hydroxide solution is added to adjust the pH of the emulsion to 6, and then the temperature of the emulsion rise to 40° C. and the crosslinking reaction continues for 2 hours to obtain electronic ink microcapsules, that is, to obtain electronic ink microcapsules containing fluorine and silicon.

Example 4 a. Sodium carboxymethyl cellulose and styrene-maleic anhydride-hexafluorobutyl (meth)acrylate-vinyl triethoxysilane tetracopolymer hydrolyzate at a mass ratio of 100:1 are added to water, and completely dissolved at 40° C. to form a solution;

b. to the solution obtained from the step a, the gelatin aqueous solution is added, wherein the mass ratio of gelatin to sodium carboxymethyl cellulose is 40:1;

c. to the mixture obtained from the step b, the electrophoretic suspension is added and stirred to form an O/W type emulsion, wherein the mass ratio of the electrophoretic suspension to the sum of gelatin, sodium carboxymethyl cellulose and the styrene-maleic anhydride-hexafluorobutyl (meth)acrylate-vinyl triethoxysilane tetracopolymer hydrolyzate is 5:1;

d. hydrochloric acid with a concentration of 10 wt % is added to adjust the pH value of the emulsion to 4, and gelatin, sodium carboxymethyl cellulose and styrene-maleic anhydride-hexafluorobutyl (meth)acrylate-vinyl triethoxysilane tetracopolymer undergo a complex coacervation reaction to form a microcapsule wall;

e. the temperature of the emulsion is cooled to 12° C., and then the crosslinking agent at a concentration of 15 wt % is added dropwise to the emulsion to allow the microcapsule walls to undergo the crosslinking reaction for 15 hours, wherein the mass ratio of the crosslinking agent to gelatin is 1.0:10;

f. 4 wt % sodium hydroxide solution is added to adjust the pH of the emulsion to 9, and then the temperature of the emulsion rise to 45° C. and the crosslinking reaction continues for 3 hours to obtain electronic ink microcapsules, that is, to obtain electronic ink microcapsules containing fluorine and silicon.

Example 5 a. Sodium carboxymethyl cellulose and styrene-maleic anhydride-hexafluorobutyl (meth)acrylate-vinyl triethoxysilane tetracopolymer hydrolyzate at a mass ratio of 120:1 are added to water, and completely dissolved at 40° C. to form a solution;

b. to the solution obtained from the step a, the gelatin aqueous solution is added, wherein the mass ratio of gelatin to sodium carboxymethyl cellulose is 50:1;

c. to the mixture obtained from the step b, the electrophoretic suspension is added and stirred to form an O/W type emulsion, wherein the mass ratio of the electrophoretic suspension to the sum of gelatin, sodium carboxymethyl cellulose and the styrene-maleic anhydride-hexafluorobutyl (meth)acrylate-vinyl triethoxysilane tetracopolymer hydrolyzate is 0.5:1;

d. hydrochloric acid with a concentration of 20 wt % is added to adjust the pH value of the emulsion to 3, and gelatin, sodium carboxymethyl cellulose and styrene-maleic anhydride-hexafluorobutyl (meth)acrylate-vinyl triethoxysilane tetracopolymer undergo a complex coacervation reaction to form a microcapsule wall;

e. the temperature of the emulsion is cooled to 15° C., and then the crosslinking agent at a concentration of 15 wt % is added dropwise to the emulsion to allow the microcapsule walls to undergo the crosslinking reaction for 20 hours, wherein the mass ratio of the crosslinking agent to gelatin is 1.5:10;

f. 7 wt % sodium hydroxide solution is added to adjust the pH of the emulsion to 12, and then the temperature of the emulsion rise to 60° C. and the crosslinking reaction continues for 1 hour to obtain electronic ink microcapsules, that is, to obtain electronic ink microcapsules containing fluorine and silicon.

In the embodiment, the barrier property of electronic ink microcapsules can be measured as follows. Firstly, electronic ink microcapsules are placed in acetone, followed by ultrasonic vibration. When the acetone liquid exhibits the color of the electrophoretic suspension, it means that capsules are penetrated, thereby the microcapsule's barrier can be determined. The microcapsules containing hexafluorobutyl (meth)acrylate and silane as produced by the method described in this example is impossible to leak until 5 hours later, while the existing microcapsules in the conventional technology begins to leak within 2 to 4 hours. This indicates that the microcapsules produced by the method described in this example exhibit good barrier property. Furthermore, due to good barrier property of the microcapsules, the dye in the electronic ink microcapsules provided by the disclosed technology can resist deterioration, and have good stability.

In addition, hexafluorobutyl (meth)acrylate used in this example is a fluorine-containing acrylic monomer, which copolymerizes with other monomers to form the emulsifier, and aggregation of fluorine atoms on the backplate surface can be avoided due to the restriction of molecular chains. Therefore, in the process for producing a display by using the electronic ink microcapsules provided by this embodiment, the electronic ink microcapsules applied on the backplate surface will not aggregate on the backplate surface, and too low surface tension of the adhesive can be avoided, and thus the defects such as the shrinkage of the adhesive coated on the backplate surface and not wetting the backplate are avoided, thereby improving the yield of the display products.

The method for producing electronic ink microcapsules according to the embodiment of the disclosed technology employs a hydrolyzate of styrene-maleic anhydride-hexafluorobutyl (meth)acrylate-vinyl triethoxysilane tetracopolymer as polyanion, and due to the fluorine-containing (meth)acrylate monomer, aggregation of fluorine atoms on the backplate surface can be avoided, and too low surface tension of the adhesive can be avoided, and thus the defects such as the shrinkage of the adhesive coated on the backplate surface and not wetting the backplate are avoided, thereby improving the yield of the products. In addition, hexafluorobutyl (meth)acrylate and silane (referred to as fluorosilicon) allows the microcapsule wall to have a low surface energy and good stability, and such electronic ink microcapsule has a small amount of fluorine-containing monomer and therefore high utilization. Si—OH from the hydrolysis of the silane can react with carboxyl groups in the microcapsule wall, which thus further improves the thermal stability and chemical stability of the microcapsule wall, and therefore significantly improves the barrier of microcapsules to the electrophoretic suspension, and also avoids deterioration of the electrophoretic particles and the dye.

Another embodiment of the disclosed technology provides an electronic ink display device, comprising electronic ink microcapsules, which comprise: gelatin, polyanion, and an electrophoretic suspension, wherein the polyanion comprises a hydrolyzate of styrene-maleic anhydride-hexafluorobutyl (meth)acrylate-vinyl triethoxysilane tetracopolymer. This electronic ink display device can overcome the defects of the conventional electronic ink display device.

The embodiment of the disclosed technology being thus described, it will be obvious that the same may be varied in many ways. Such variations are not to be regarded as a departure from the spirit and scope of the disclosed technology, and all such modifications as would be obvious to those skilled in the art are intended to be comprised within the scope of the following claims.

What is claimed is:

1. An electronic ink microcapsule, comprising:
gelatin,
polyanion, and
an electrophoretic suspension, wherein the polyanion comprises a hydrolyzate of styrene-maleic anhydride-hexafluorobutyl (meth)acrylate-vinyl triethoxysilane tetracopolymer.

2. The electronic ink microcapsule according to claim 1, wherein the styrene-maleic anhydride-hexafluorobutyl (meth)acrylate-vinyl triethoxysilane tetracopolymer is of the general formula:

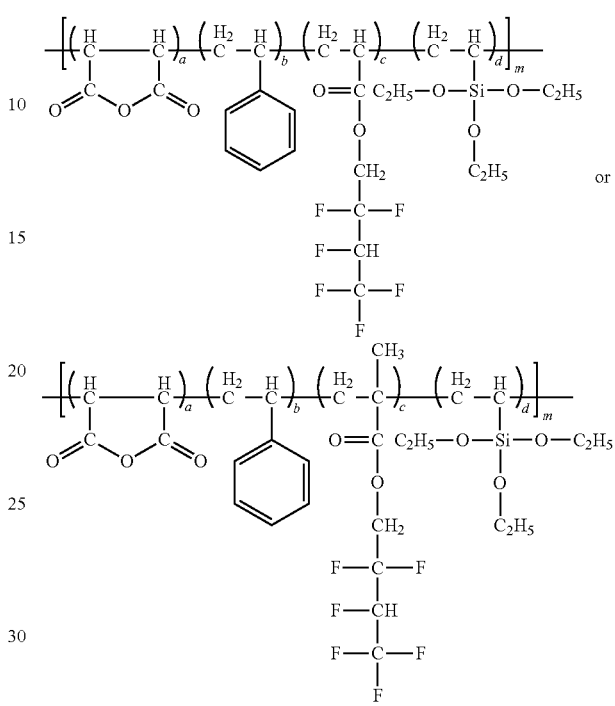

in which a is any number at or between about 1 to about 10, b is any number at or between about 1 to about 50, c is any number at or between about 1 to about 50, d is any number at or between about 1 to about 50, and m is any number at or between about 10 to about 100.

3. The electronic ink microcapsule according to claim 2, wherein the styrene-maleic anhydride-hexafluorobutyl (meth)acrylate-vinyl triethoxysilane tetracopolymer has a number-average molecular weight of about 3,000 to about 550,000.

4. The electronic ink microcapsule according to claim 1, wherein the polyanion further comprises sodium carboxymethyl cellulose.

5. The electronic ink microcapsule according to claim 4, wherein the mass ratio of the gelatin to the sodium carboxymethyl cellulose is between about 0.5:1 and about 50:1.

6. The electronic ink microcapsule according to claim 4, wherein the mass ratio of the sodium carboxymethyl cellulose to the styrene-maleic anhydride-hexafluorobutyl (meth)acrylate-vinyl triethoxysilane tetracopolymer is between about 1:1 and about 120:1.

7. The electronic ink microcapsule according to claim 4, wherein the electrophoretic suspension is tetrachloroethylene which comprises electrophoretic particles, dye and auxiliary, and the mass ratio of the electrophoretic suspension to the gelatin, the sodium carboxymethyl cellulose and the styrene-maleic anhydride-hexafluorobutyl (meth)acrylate-vinyl triethoxysilane tetracopolymer is between about 0.5:1 and about 100:1.

8. The electronic ink microcapsule according to claim 1, further comprising one or more crosslinking agent(s) selected from the group consisting of formaldehyde, acetaldehyde, succinic aldehyde, and glutaraldehyde.

9. A method for producing an electronic ink microcapsule, comprising:
adding a hydrolyzate of styrene-maleic anhydride-hexafluorobutyl (meth)acrylate-vinyl triethoxysilane tetracopolymer with gelatin and an electrophoretic suspension to form an electronic ink microcapsule.

10. The method according to claim 9, comprising:
mixing sodium carboxymethyl cellulose and the hydrolysate of styrene-maleic anhydride-hexafluorobutyl (meth)acrylate-vinyl triethoxysilane tetracopolymer with water to form a solution;
introducing gelatin into the solution to obtain a mixture;
incorporating the electrophoretic suspension into the mixture to form an emulsion;
adjusting the pH value of the emulsion with an acid, and rendering the sodium carboxymethyl cellulose, the styrene-maleic anhydride-hexafluorobutyl (meth)acrylate-vinyl triethoxysilane tetracopolymer and the gelatin subject to a complex coacervation reaction to form microcapsule walls;
introducing a crosslinking agent into the emulsion to allow the microcapsule walls to be cured and crosslinked; and
adjusting the pH value of the emulsion with a base and allowing the microcapsule walls to continue the cure-crosslinking reaction to obtain the electronic ink microcapsule.

11. The method according to claim 10, wherein the styrene-maleic anhydride-hexafluorobutyl (meth)acrylate-vinyl triethoxysilane tetracopolymer is of the general formula:

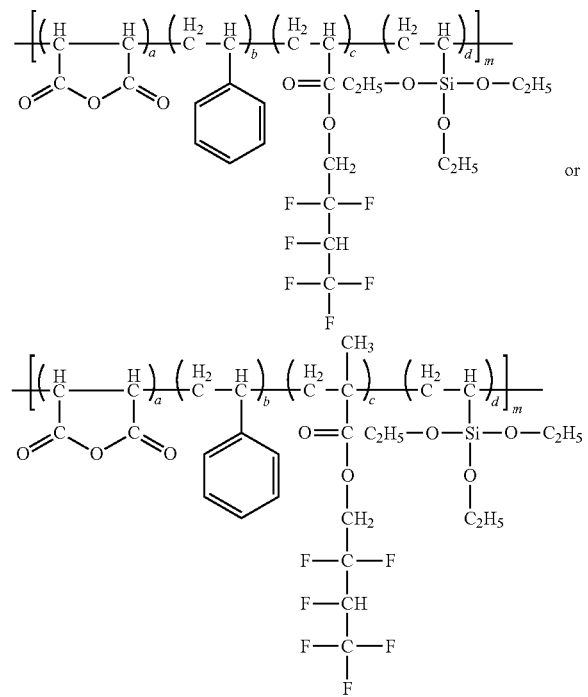

in which a is any number at or between about 1 to about 10, b is any number at or between about 1 to about 50, c is any number at or between about 1 to about 50, d is any number at or between about 1 to about 50, and m is any number at or between about 10 to about 100.

12. The method according to claim 11, wherein the styrene-maleic anhydride-hexafluorobutyl (meth)acrylate-vinyl triethoxysilane tetracopolymer has a number-average molecular weight of about 3,000 to about 550,000.

13. The method according to claim 10, wherein the mass ratio of the sodium carboxymethyl cellulose to the styrene-maleic anhydride-hexafluorobutyl (meth)acrylate-vinyl triethoxysilane tetracopolymer is between about 1:1 and about 120:1 in the solution.

14. The method according to claim 10, wherein the mass ratio of the gelatin to the sodium carboxymethyl cellulose is between about 0.5:1 and about 50:1 in the mixture.

15. The method according to claim 10, wherein, in the emulsion, the electrophoretic suspension is tetrachloroethylene which comprises electrophoretic particles, dye and auxiliary, and the mass ratio of the electrophoretic suspension to the gelatin, the sodium carboxymethyl cellulose and the styrene-maleic anhydride-hexafluorobutyl (meth)acrylate-vinyl triethoxysilane tetracopolymer is between about 0.5:1 and about 100:1.

16. The method according to claim 10, wherein the acid is hydrochloric acid, sulfuric acid, acetic acid, citric acid or tartaric acid, and its concentration is between about 0.05 wt % and about 20 wt %.

17. The method according to claim 10, wherein, the temperature of the emulsion is cooled down to about 0° C. to about 15° C. prior to the introducing of the crosslinking agent, and the cure-crosslinking reaction time is about 1 hour to about 20 hours.

18. The method according to claim 10, wherein the crosslinking agent is one or more selected from the group consisting of formaldehyde, acetaldehyde, succinic aldehyde, and glutaraldehyde.

19. The method according to claim 10, wherein the adjusted pH value of the emulsion by adding the base is between about 1 to about 12 and the cure-crosslinking reaction continues at about 30° C. to about 60° C. for about 1 hour to about 5 hours.

20. An electronic ink display device, comprising electronic ink microcapsules, which comprise:
gelatin,
polyanion, and
an electrophoretic suspension, wherein the polyanion comprises a hydrolyzate of styrene-maleic anhydride-hexafluorobutyl (meth)acrylate-vinyl triethoxysilane tetracopolymer.

* * * * *